United States Patent Office 2,811,542
Patented Oct. 29, 1957

2,811,542

WATER SOLUBLE ORGANOSILICON COMPOUNDS

John L. Speier and Leonard M. Shorr, Pittsburgh, Pa., assignors to Dow Corning Corporation, Midland, Mich., a corporation of Michigan No Drawing. Application August 5, 1953,
Serial No. 372,608

4 Claims. (Cl. 260—448.8)

This application relates to water soluble dimethylsilane glycerin esters.

As is well known, organopolysiloxanes are useful as release agents in the molding of organic plastic materials. Heretofore the siloxanes have been used in the form of aqueous emulsions or as solutions in organic solvents. Both of these forms have disadvantages in that the emulsions have a tendency to separate and the use of organic solvents requires adequate ventilation and special precautions. It would be highly desirable to have a water solution of an organosilicon compound which could be employed in release applications. Heretofore the primary water soluble silicones were the alkali metal salts of organosilanols. These materials, however, are alkaline in nature and are not suitable for many uses.

It is the object of this invention to provide a water soluble neutral organosilicon composition which can be employed for release purposes and for hydrophobing.

This invention relates to compounds of the formula $(Me_2SiOCH_2CHOHCH_2O)_x$, where $x$ has a value of at least 1.

The compounds of this invention may be prepared by reacting dimethyldialkoxysilanes or dimethylsilazanes with glycerin. When alkoxysilanes are used, it is best to employ lower alkyl alkoxysilanes such as dimethyldialkoxysilane, dimethyldimethoxysilane or dimethyldibutoxysilane. Reaction proceeds by ester interchange between the glycerin and the alkoxysilane whereby the glycerin is linked to the silicon and a lower alcohol is produced. The lower alcohol is distilled off during the reaction. In this method it is best to employ an excess of the alkoxysilane (i. e., more than 1 mol of alkoxysilane per mol of glycerin) because alkoxysilanes form azeotropes with lower alcohols and thus, some of the alkoxysilane will distill with the alcohol.

The best method of preparing the compounds of this invention is by reacting glycerin with dimethylsilazanes. In this reaction the by-product is ammonia which is easily disposed of. In order to obtain the compounds of this invention, in good yield, the relative proportions of the glycerin and silazane should be such that there is at least about 1 mol of glycerin per mol of $(Me_2SiNH)$ unit. In other words, it is preferred that there be no more than about 1 dimethylsilazane unit for each molecule of glycerin.

After reaction has been completed by either of the above methods the product is then distilled at reduced pressure. Upon distillation a cyclic compound of the formula

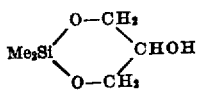

is obtained. This material is a clear viscous liquid which is water soluble. Upon standing at room temperature the material will polymerize spontaneously by rearrangement of the silicon-oxygen-carbon bonds to give polymeric materials having higher viscosities than the original cyclic monomer. On heating, the polymerized material will depolymerize to form the monomeric cyclic compound. This polymerization and depolymerization process can be repeated at will.

The compounds of this invention are particularly useful as mold release agents for organic plastic materials such as rubber.

The following examples are illustrative only and should not be construed as limiting the invention which is properly delineated in the appended claims.

Example 1

92 g. of freshly distilled glycerin and 222 g. of dimethyldiethoxysilane were mixed and refluxed with approximately 100 ml. of pyridine. An azeotrope of ethyl alcohol and dimethyldiethoxysilane was distilled off as it formed. A total of 137 ml. of the azeotrope was obtained. The residue was distilled to remove the pyridine and there remained a viscous clear liquid. This material was then distilled at temperatures up to 300° C. at 1 mm. pressure. The distillate was a clear viscous fluid having the formula

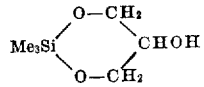

Upon standing overnight the material solidified due to polymerization. Both the original cyclic compound and the polymer were soluble in water.

Example 2

59 g. of hexamethylcyclotrisilazane was added slowly with stirring to a solution of 74.2 g. of glycerin in 60 g. of dimethylformamide. An exothermic reaction set in with the liberation of ammonia. A water bath was used to keep the reaction temperature below 80° C. When the addition was complete the mixture was heated at 135° C. to 155° C. for approximately 20 hours. The dimethylformamide was removed by distillation and the residue was distilled to give the compound

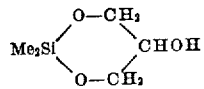

which had the following properties: boiling point 112 to 129° C. at 4 mm. $n_D^{25}$ 1.4387 to 1.4452, $d_4^{25}$ 1.117 to 1.113, specific refraction .2391. Upon analysis the material was found to contain 11.4% hydroxyl as compared with the calculated value of 11.5%.

Upon standing at room temperature the viscosity of the material increased. After 3 days the refractive index at 25° C. was 1.4487 to 1.4470. The density at 25° C. was 1.128 while the specific refraction was .2397. The fact that the specific refraction did not change essentially indicates that the material polymerized by bond rearrangement and thus had the formula

where $x$ is greater than 1. Both the initial cyclic material and the polymer were water soluble.

That which is claimed is:

1. 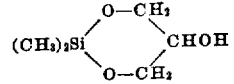

2. A method for the preparation of

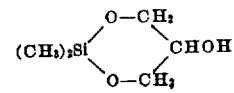

comprising contacting a dimethylsilazane with glycerin in the liquid phase.

3. A method for the preparation of

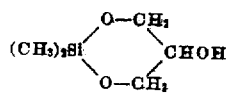

comprising contacting hexamethylcyclotrisilazane with glycerin in the liquid phase in the ratio of at least one mol glycerin per mol of $[(CH_3)_2SiNH]$ unit.

4. A composition consisting essentially of a homogeneous solution of

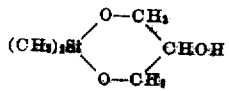

in water.

References Cited in the file of this patent

UNITED STATES PATENTS

| | | |
|---|---|---|
| 1,178,731 | Knorr | Apr. 11, 1916 |
| 2,441,066 | Hanford | May 4, 1948 |
| 2,584,343 | Goodwin | Feb. 5, 1952 |
| 2,626,272 | Speier | Jan. 20, 1953 |
| 2,640,067 | Speier | May 26, 1953 |

OTHER REFERENCES

Schriner et al.: "Identification of Organic Compounds," 3rd edition (1948), pages 66–67.

UNITED STATES PATENT OFFICE

CERTIFICATE OF CORRECTION

Patent No. 2,811,542                                        October 29, 1957

John L. Speier et al.

It is hereby certified that error appears in the printed specification of the above numbered patent requiring correction and that the said Letters Patent should read as corrected below.

Column 2, line 25, left-hand portion of the formula, for "$Me_3Si$" read -- $Me_2Si$ --.

Signed and sealed this 7th day of January 1958.

(SEAL)
Attest:

KARL H. AXLINE
Attesting Officer

ROBERT C. WATSON
Commissioner of Patents